(12) United States Patent
Staley et al.

(10) Patent No.: US 9,428,077 B2
(45) Date of Patent: Aug. 30, 2016

(54) FREEZE PREPARATION FOR A FUEL CELL SYSTEM

(71) Applicant: Ford Global Technologies, LLC, Dearborn, MI (US)

(72) Inventors: Scott M. Staley, Dearborn, MI (US); William F. Sanderson, Commerce Township, MI (US); Milos Milacic, New Boston, MI (US); Hasdi R. Hashim, Ann Arbor, MI (US); Daniel William Forthoffer, Grosse Pointe Woods, MI (US); Craig Michael Mathie, White Lake Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 14/047,449

(22) Filed: Oct. 7, 2013

(65) Prior Publication Data

US 2015/0099200 A1 Apr. 9, 2015

(51) Int. Cl.

| H01M 8/04 | (2016.01) |
|---|---|
| B60L 11/18 | (2006.01) |
| B60L 1/00 | (2006.01) |
| B60L 1/02 | (2006.01) |
| B60L 3/00 | (2006.01) |
| B60L 3/12 | (2006.01) |
| H01M 8/10 | (2016.01) |

(52) U.S. Cl.
CPC ............ *B60L 11/1888* (2013.01); *B60L 1/003* (2013.01); *B60L 1/02* (2013.01); *B60L 3/0053* (2013.01); *B60L 3/12* (2013.01); *B60L 11/1803* (2013.01); *B60L 11/1861* (2013.01); *B60L 11/1885* (2013.01); *B60L 11/1887* (2013.01); *B60L 11/1892* (2013.01); *B60L 11/1894* (2013.01); *H01M 8/0432* (2013.01); *H01M 8/0485* (2013.01); *H01M 8/04179* (2013.01); *H01M 8/04253* (2013.01); *H01M 8/04291* (2013.01); *H01M 8/04507* (2013.01); *H01M 8/04753* (2013.01); *B60L 2240/34* (2013.01); *B60L 2240/36* (2013.01); *B60L 2240/622* (2013.01); *B60L 2240/662* (2013.01); *B60L 2240/70* (2013.01); *B60L 2240/80* (2013.01); *B60L 2260/52* (2013.01); *B60L 2260/54* (2013.01); *H01M 8/04335* (2013.01); *H01M 8/04358* (2013.01); *H01M 2008/1095* (2013.01); *H01M 2250/20* (2013.01); *Y02E 60/50* (2013.01); *Y02T 10/705* (2013.01); *Y02T 10/7044* (2013.01); *Y02T 10/7291* (2013.01); *Y02T 90/16* (2013.01); *Y02T 90/162* (2013.01); *Y02T 90/32* (2013.01); *Y02T 90/34* (2013.01)

(58) Field of Classification Search
CPC ............ B60L 11/18; H01M 8/04291; H01M 8/0485; H01M 8/04179; H01M 8/04253; H01M 8/0432; H01M 8/04335; H01M 8/04358; H01M 8/04507; H01M 8/04753
USPC .......................................................... 429/413
See application file for complete search history.

(56) References Cited

U.S. PATENT DOCUMENTS 7,189,467 B2 3/2007 Wakabayashi et al.
7,588,844 B2 9/2009 Hayashi et al.
(Continued)

*Primary Examiner* — Karie O'Neill Apicella
(74) *Attorney, Agent, or Firm* — Brooks Kushman P.C.; Damian Porcari

(57) ABSTRACT

A vehicle includes a fuel cell system, and a controller configured to receive a first signal indicative of a predicted ambient temperature at a specified location, and command the fuel cell system to operate at a reduced relative humidity when the predicted ambient temperature is below a threshold value. A method for controlling a fuel cell system includes receiving a first signal at a controller indicative of a predicted ambient temperature for a specified location, and operating the fuel cell system at a reduced relative humidity when the predicted ambient temperature is below a threshold value. A fuel cell system includes a fuel cell stack, and a controller configured to, in response to receiving a predicted freezing condition, command the fuel cell stack to operate at a lower relative humidity level for a time period preceding a predicted time for system shut down.

14 Claims, 4 Drawing Sheets

(56) References Cited

U.S. PATENT DOCUMENTS

| | | |
|---|---|---|
| 8,158,288 B2 | 4/2012 | Goebel et al. |
| 2007/0298289 A1* | 12/2007 | Clingerman ...... H01M 8/04223 429/429 |
| 2008/0171240 A1 | 7/2008 | Ju et al. |
| 2011/0196554 A1 | 8/2011 | Limbeck et al. |
| 2012/0028146 A1 | 2/2012 | Lee et al. |

* cited by examiner

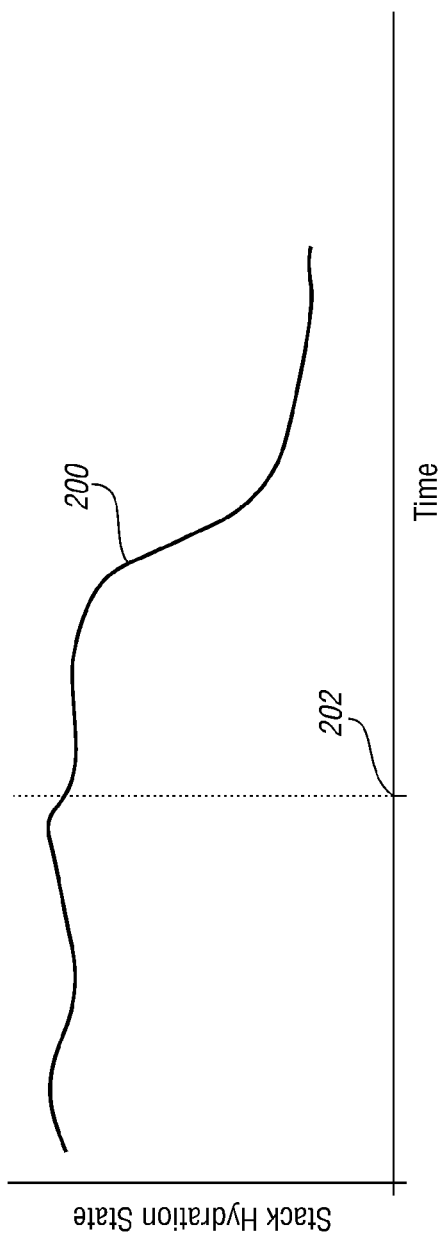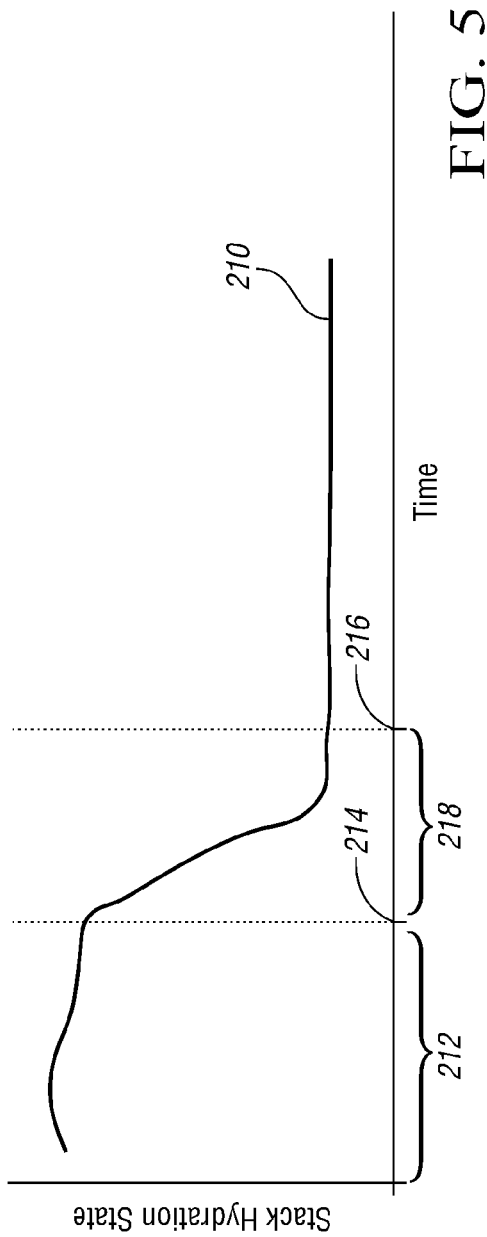

FREEZE PREPARATION FOR A FUEL CELL SYSTEM

TECHNICAL FIELD

Various embodiments relate to a system and a method for preparing a fuel cell for freezing conditions.

BACKGROUND

It is known that a number of fuel cells are joined together to form a fuel cell stack. Such a stack generally provides electrical current in response to electrochemically converting hydrogen and oxygen into water. The electrical current generated in such a process is used to drive various devices in a vehicle or other such apparatus. A supply generally provides hydrogen to the fuel cell stack. The fuel cell stack may use less hydrogen than provided by the supply to generate electrical power. An ejector receives unused hydrogen discharged from the fuel cell stack and combines the unused hydrogen with the hydrogen generated from the supply to sustain a flow of hydrogen to the fuel cell stack.

During fuel cell operation, byproducts such as product water and nitrogen, and unconsumed hydrogen may form at the anode side of a fuel cell stack. Liquid water, such as droplets, or water vapor may need to be removed to prevent water blockages within fuel cell stack flow field channels or an ejector.

For a fuel cell application in a vehicle, the fuel cell may be required to operate in freezing ambient temperatures. The vehicle and fuel cell may be exposed to temperatures of −25 Celsius or even lower, well below the freezing point for water. Cold weather operating issues need to be addressed for a fuel cell vehicle to operate in climates with extreme ambient temperatures, and to meet user expectations for the vehicle. When exposed to freezing conditions, any water found within the fuel cell system may freeze, forming ice blockages that may prevent reactant or byproduct flow and result in delayed or unsuccessful fuel cell system start ups or a reduction in operating performance.

In some prior art systems, water is removed from the fuel cell system at system shut down to prevent the water from freezing if the fuel cell system is exposed to freezing conditions. Prior art systems may use high pressure air to remove water from the stack membrane after system shut down. Other prior art systems may heat the system to remove liquid water via evaporation and dry the system; however, this may be energy intensive and reduce efficiencies. Prior art systems may also have an on-board monitor to wake up the fuel cell system after system shut down and conduct a pressurized-air blow out or enable a heating process if ambient temperatures go below a threshold.

SUMMARY

In an embodiment, a vehicle is provided with a fuel cell system having a fuel cell stack for generating power, along with a controller. The controller is configured to (i) receive a first signal indicative of a predicted ambient temperature at a specified location, and (ii) command the fuel cell system to operate at a reduced relative humidity in the fuel cell stack when the predicted ambient temperature is below a threshold value.

In another embodiment, a method for controlling a fuel cell system is provided. A first signal is received at a controller and is indicative of a predicted ambient temperature for a specified location. The fuel cell system is operated at a reduced relative humidity in a fuel cell stack when the predicted ambient temperature is below a threshold value in preparation for system shut down at the predicted ambient temperature to reduce ice formation in the system.

In yet another embodiment, a fuel cell system is provided with a fuel cell stack, along with a controller. In response to receiving a predicted freezing condition, the controller is configured to command the fuel cell stack to operate at a lower relative humidity level for a time period preceding a predicted time for system shut down.

Various embodiments of the present invention have associated non-limiting advantages. For example, by reducing the humidity in the fuel cell stack prior to shut down based on predictive information, the system hydration state is controlled prior to freezing, which may increase the lifetime for the fuel cell stack, lead to faster fuel cell system start times in freezing conditions, and meet or exceed user expectations. It also reduces the need for post shut down processes to reduce the stack hydration state, which are less effective, and reduce fuel cell efficiencies.

BRIEF DESCRIPTION OF THE DRAWINGS

FIG. 4 is a graph illustrating temperature in a fuel cell system according to a prior art control strategy; and FIG. 5 is a graph illustrating temperature in a fuel cell system according to the control strategy of FIG. 3.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Description of constituents in chemical terms refers to the constituents at the time of addition to any combination specified in the description, and does not necessarily preclude chemical interactions among constituents of the mixture once mixed.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
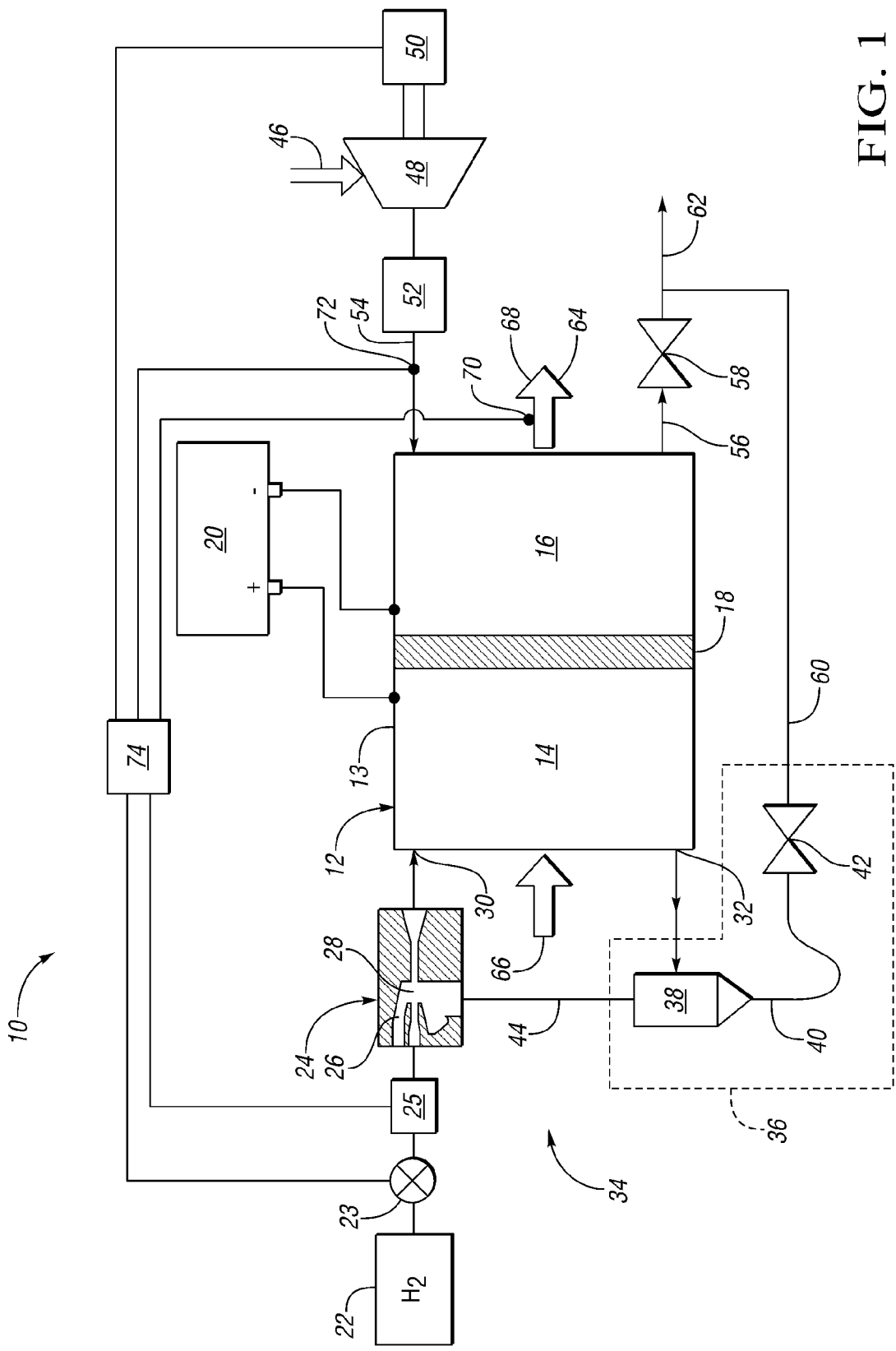
FIG. 1 is a schematic of an embodiment of a fuel cell system according to an embodiment.

FIG. 1 schematically illustrates a fuel cell system ("the system") 10 as a process flow diagram according to at least one embodiment. For example, system 10 may be used in a vehicle to provide electrical power to operate an electric motor to propel the vehicle or perform other vehicle functions. The system 10 may be implemented in a fuel cell based electric vehicle or a fuel cell based hybrid vehicle or any other such apparatus that uses electrical current to drive various devices.

The system 10 has a fuel cell stack ("the stack") 12. The stack 12 includes multiple cells, with each cell 13 having an anode side 14, a cathode side 16, and a membrane 18 therebetween. Only one fuel cell 13 of the fuel cell stack 12 is illustrated in FIG. 1, although the stack 12 contains any number of cells. The stack 12 electrically communicates with and provides energy, for example, to a high voltage bus 20 or a traction battery. The stack 12 generates stack current in response to electrochemically converting hydrogen and oxygen. The stack 12 may also have a cooling loop (not shown).

Various electrical devices may be coupled to the battery 20 to consume such power in order to operate. If the system 10 is used in connection with a vehicle, the devices may include a motor or a plurality of vehicle electrical components that each consume power to function for a particular purpose. For example, such devices may be associated with and not limited to a vehicle powertrain, cabin heating and cooling, interior/exterior lighting, entertainment devices, and power locking windows. The particular types of devices implemented in the vehicle may vary based on vehicle content, the type of motor used, and the particular type of fuel cell stack implemented.

During operation of the system 10, product water, residual fuel such as hydrogen, and byproducts such as nitrogen, may accumulate at the anode side 14 of the stack 12. Attempts have been made to remove the liquid product water and byproducts and to reuse the residual hydrogen and at least a portion of the water vapor. One approach is to collect those constituents in a purge assembly 36 downstream of the stack 12, separate at least a portion of the liquid water and/or nitrogen, and return the remaining constituents to the stack 12 via a return passageway in a recirculation loop.

A primary fuel source 22 is connected to the anode side 14 of the stack 12, such as a primary hydrogen source, to provide a supply fuel stream (or an anode stream). Non-limiting examples of the primary hydrogen source 22 are a high-pressure hydrogen storage tank or a hydride storage device. For example, liquid hydrogen, hydrogen stored in various chemicals such as sodium borohydride or alanates, or hydrogen stored in metal hydrides may be used instead of compressed gas. A tank valve 23 controls the flow of the supply hydrogen. A pressure regulator 25 regulates the flow of the supply hydrogen.

The hydrogen source 22 is connected to one or more ejectors 24. The ejector may be a variable or multistage ejector or other suitable ejector. The ejector 24 is configured to combine the supply hydrogen (e.g., hydrogen received from the source 22) with unused hydrogen (e.g., recirculated from the fuel cell stack 12) to generate an input fuel stream. The ejector 24 controls the flow of the input fuel stream to the stack 12. The ejector 24 has a nozzle 26 supplying hydrogen into the converging section of a converging-diverging nozzle 28. The diverging section of the nozzle 28 is connected to the input 30 of the anode side 14.

The output 32 of the anode side 14 is connected to a recirculation loop 34. The recirculation loop 34 may be a passive recirculation loop, as shown, or may be an active recirculation loop according to another embodiment. Typically, an excess of hydrogen gas is provided to the anode side 14 to ensure that there is sufficient hydrogen available to all of the cells in the stack 12. In other words, under normal operating conditions, hydrogen is provided to the fuel cell stack 12 above a stoichiometric ratio of one, i.e. at a fuel-rich ratio relative to exact electrochemical needs. The unused fuel stream, or recirculated fuel stream, at the anode output 32 may include various impurities such as nitrogen and water both in liquid and vapor form in addition to hydrogen. The recirculation loop 34 is provided such that excess hydrogen unused by the anode side 14 is returned to the input 30 so it may be used and not wasted.

Accumulated liquid and vapor phase water is an output of the anode side 14. The anode side 14 requires humidification for efficient chemical conversion and to extend membrane life. The recirculation loop 34 may be used to provide water to humidify the supply hydrogen gas before the input 30 of the anode side 14. Alternatively, a humidifier may be provided to add water vapor to the input fuel stream.

The recirculation loop 34 contains a purging assembly 36 to remove impurities or byproducts such as excess nitrogen, liquid water, and/or water vapor from the recirculation stream. The purging assembly 36 includes a water separator or knock-out device 38, a drain line 40 and a control valve 42, such as a purge valve. The separator 38 receives a stream or fluid mixture of hydrogen gas, nitrogen gas, and water from the output 32 of the anode side 14. The water may be mixed phase and contain both liquid and vapor phase water. The separator 38 removes at least a portion of the liquid phase water, which exits the separator through drain line 40. At least a portion of the nitrogen gas, hydrogen gas, and vapor phase water may also exit the drain line 40, and pass through a control valve 42, for example, during a purge process of the fuel cell stack 12. The control valve 42 may be a solenoid valve or other suitable valve. The remainder of the fluid in the separator 38 exits through passageway 44 in the recirculation loop 34, which is connected to the ejector 24. The stream in passageway 44 may contain a substantial amount of hydrogen compared to the stream in drain line 40. The fluid in passageway 44 is fed into the converging section of the converging-diverging nozzle 28 where it mixes with incoming hydrogen from the nozzle 26 and hydrogen source 22.

The cathode side 16 of the stack 12 receives oxygen in a cathode stream, for example, as a constituent in an air source 46 such as atmospheric air. In one embodiment, a compressor 48 is driven by a motor 50 to pressurize the incoming air. The pressurized air, or cathode stream, may be humidified by a humidifier 52 before entering the cathode side 16 at inlet 54. The water may be needed to ensure that membranes 18 for each cell 13 remain humidified to provide for optimal operation of the stack 12. The output 56 of the cathode side 16 is configured to discharge excess air and is connected to a valve 58. Drain line 60 from the purging assembly 36, may be connected to an outlet 62 downstream of the valve 58. In other embodiments, the drain lines may be plumbed to other locations in the system 10.

The stack 12 may be cooled using a coolant loop 64 as is known in the art. The coolant loop 64 has an inlet 66 and an outlet 68 to the stack 12 to cool the stack. The coolant loop 64 may have a temperature sensor 70 to determine the coolant temperature.

The stack 12 may also have a humidity sensor 72 positioned at the inlet 54 to the cathode side 16 of the stack 12. The sensor 72 may also include a temperature sensing module.

A controller 74 receives signals from the sensors 70, 72, and other sensors that may be associated with the fuel cell system 10. The controller 74 may be a single controller or multiple controllers in communication with one another. The controller 74 is also in communication with the valve 23, regulator 25, and motor 50.

During operation the stoichiometry, or fuel to air ratio, of the fuel cell system may be controlled based on the fuel cell operating state, environmental conditions, and the like. The stoichiometry may be controlled using the valve 23 and regulator 25 on the anode side 14 to control the flow rate of fuel, or hydrogen to the stack 12, and using the compressor 48 and motor 50 on the cathode side 16 to control the flow rate of air to the stack 12. The system 10 may be operated through a range of stoichiometries and fuel to air ratios, including fuel rich, fuel lean, and at a stoichiometric ratio of one. As the system 10 is operated at a leaner condition, the amount of water byproduct will decrease, as the amount of hydrogen that is being provided to the stack 12 decreases.

Figure 2:
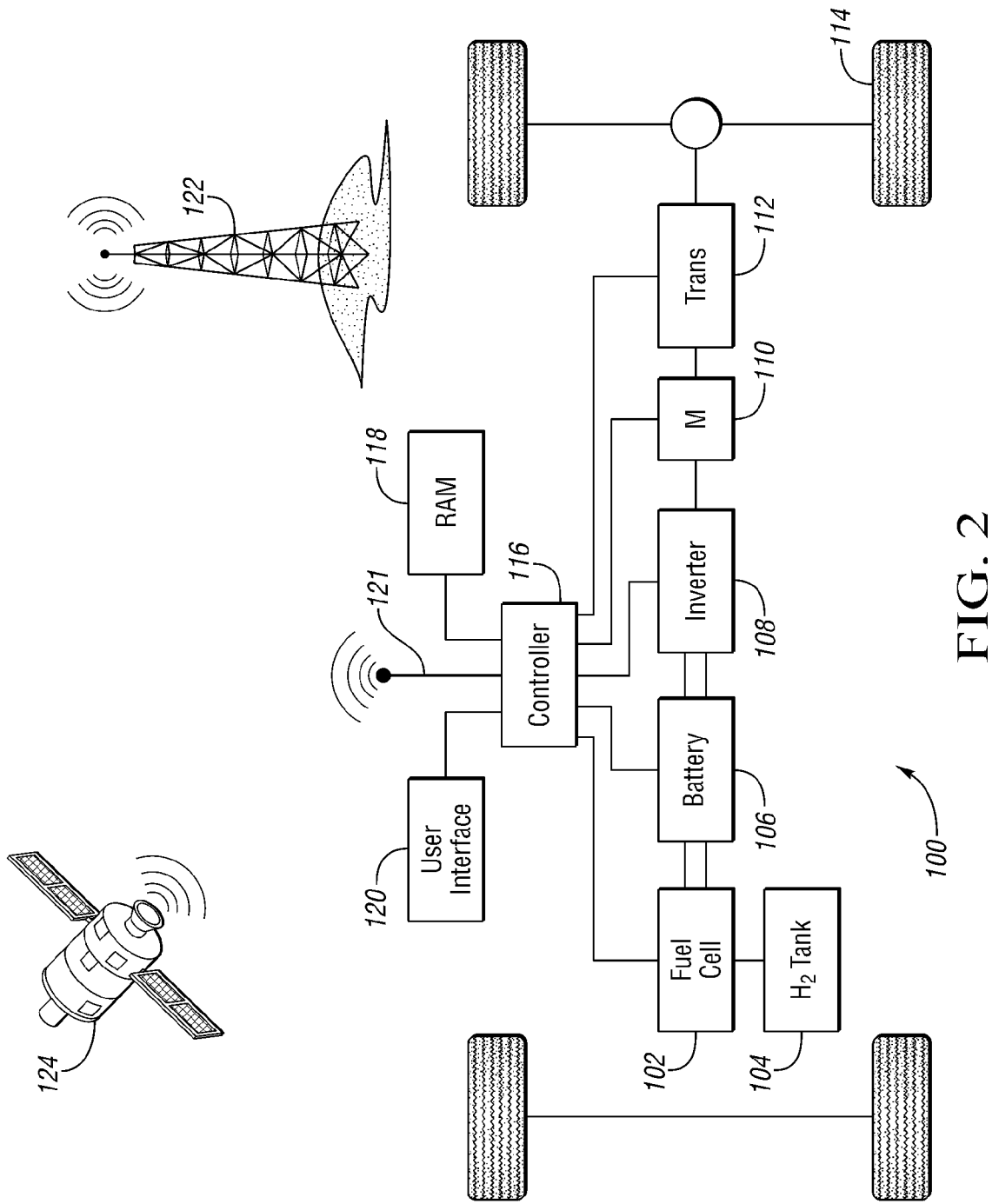
FIG. 2 is a schematic of a fuel cell system in a vehicle according to an embodiment.

FIG. 2 illustrates a vehicle 100 having a fuel cell system ("the system") 102 according to an embodiment. The system 102 may be a fuel cell system as described with respect to FIG. 1. The system 102 receives hydrogen from a storage tank 104 and air from the ambient environment to operate, and provides electrical energy to a battery 106 for storage. The battery 106 is connected to an inverter 108, which in turn powers an electric machine 110. The electric machine 110 may act as a motor to propel the vehicle 100, and in some embodiments, act as a generator to charge the battery 106. The electric machine 110 is connected to a transmission 112. The transmission 112 is connected to wheels 114 of the vehicle 100.

The vehicle has a control system 116. The control system 116 may include any number of controllers, and may be integrated into a single controller, or have various modules. Some or all of the controllers may be connected by a controller area network (CAN) or other system. The control system 116 may be connected to random access memory 118 or another data storage system. In some embodiments, the vehicle has a user interface 120 in communication with the control system 116. The user interface 120 may include an on-board vehicle system, and may also include a receiver configured to receive information and inputs from a remote user using a cellular phone, a computer, or the like. The user interface may also include a navigation system.

The control system 116 is in communication and is configured to control the system 102, battery 106, inverter 108, electric machine 110, and transmission 112. The control system 116 is also configured to receive signals from these vehicle components related to their status and the vehicle state.

The control system 116 has a receiver 121, which may include one or more antennae. Each antenna may be configured to wirelessly receive signals from various sources, including, but not limited to, cellular towers 122, satellites 124, wireless network servers, and the like.

Figure 3:
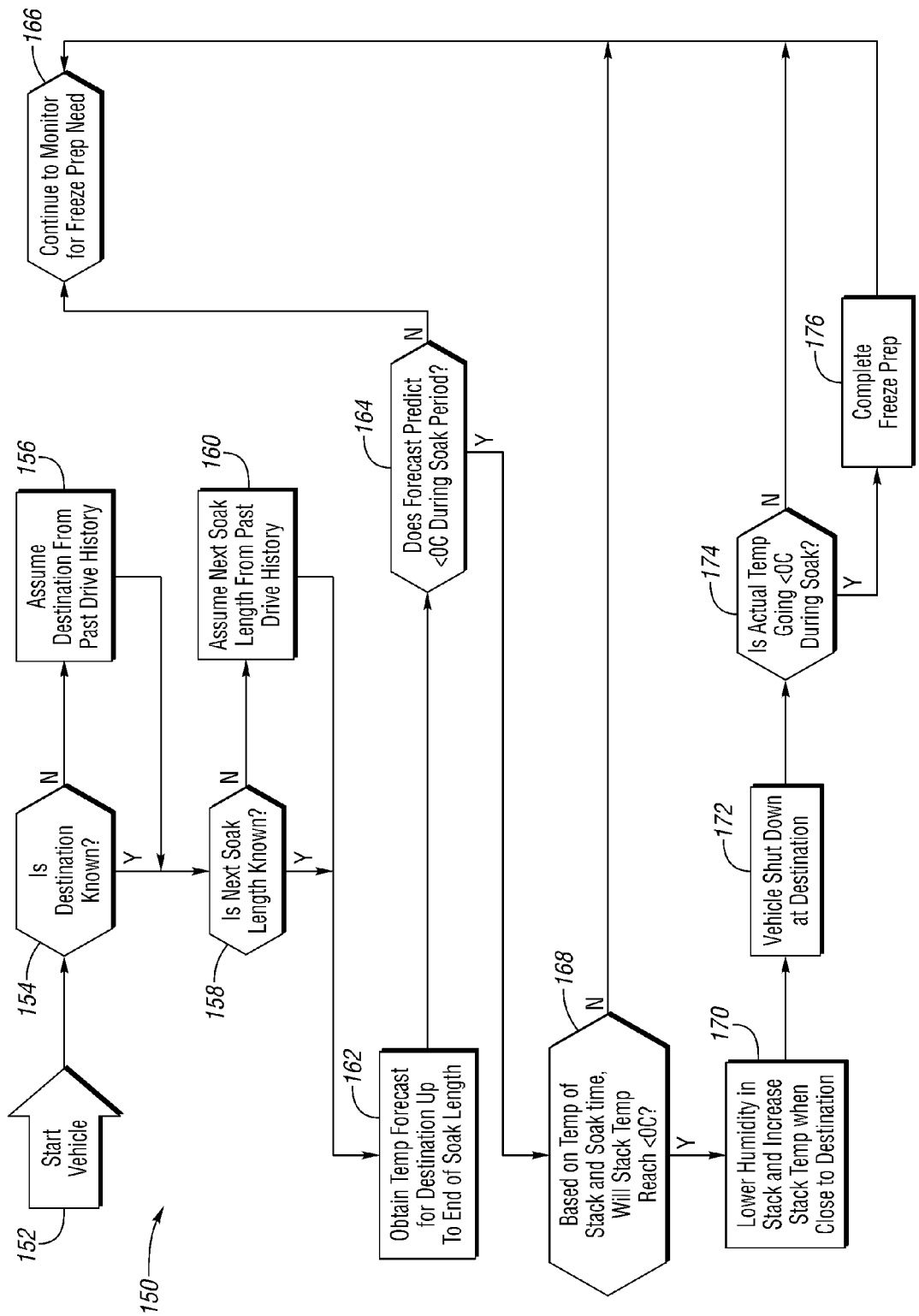
FIG. 3 is a flow chart illustrating a method for controlling a fuel cell system according to an embodiment.

FIG. 3 illustrates a flow chart of a method 150 for use a fuel cell system according to an embodiment of the present disclosure. In other embodiments, various steps in the method 150 may be combined, rearranged, or omitted. In one embodiment, the method 150 is used by the control system 116 of the vehicle 100.

The method 150 begins at 152 and proceeds to block 154. At block 154, the controller determines if the destination is known. The predicted destination may be known based on an input to the user interface providing a destination, for example, as a navigation entry. The predicted destination may also be provided at step 156 and is based on vehicle history or user history stored in memory, be predicted based on machine learning, or the like.

At block 158, the controller determines if the next soak length is known. The soak length corresponds to a time that the vehicle is predicted to be shut down. The soak length may also include information related to the length of time that the fuel cell will remain shut down as well as an estimated or predicted time for start up of the fuel cell system. The controller may receive a signal from the user interface providing information on the soak length. The controller may also estimate or predict the soak length at 160 using prior driving history, and the like.

The controller then obtains a signal indicative of a weather forecast for the predicted destination location for the predicted soak length at block 162. The weather forecast may include a predicted ambient or environmental temperature for the destination over the time period for the soak length. Alternatively, the weather forecast may include only a low temperature forecast for the destination over the time period for the soak length. The controller may receive a wireless signal providing the temperature forecast information, for example, from satellite weather, through a cellular network, via a weather radio signal, or the like. The controller may also receive a signal from a user input through the user interface providing a predicted low temperature value for the predicted destination.

At block 164, the controller determines if the predicted ambient temperature over the soak length will go below a threshold value (T1). In one embodiment, the threshold value may zero Celsius. In another embodiment the threshold value may be above zero Celsius to provide a margin for weather forecast error. In other embodiments, the threshold value may be above or below the freezing level, or at zero Celsius. If the lowest predicted ambient temperature during the soak length is above the threshold temperature, the controller proceeds to block 166 and continues to monitor, for example, in case of a destination, soak length, or predicted temperature change.

If the lowest predicted temperature during the soak length is below the threshold temperature, the controller proceeds to block 168. At block 168, the controller determines whether the temperature of the stack will go below a temperature threshold value (T2), or freezing level, based on the predicted ambient temperature, the predicted soak length, the stack operating temperature, and other factors. The threshold value (T2) at step 168 may be different than or the same as the threshold value (T1) at step 164. For example, if the predicted ambient temperature is near the threshold value and the soak length is short, the stack temperature may remain above the freezing level. As the predicted ambient temperature decreases and the soak length increases, it becomes more likely that the stack temperature will reach the freezing level. The controller may reference a stored reference table at block 168, or may use various stored equations and models to determine a predicted stack temperature. If the controller determines that the stack temperature is not predicted to go below a threshold value, such as zero Celsius, the method 150 proceeds to block 166.

If the predicted stack temperature during the soak length is below its threshold temperature value (T2), the controller proceeds to block 168. In other embodiments, the controller may assume that the stack temperature will be below the threshold value if the predicted ambient temperature is below its threshold value at 164, and proceed directly from step 164 to 170.

At block 170, the fuel cell system is commanded and controlled to operate at a lower relative humidity before the fuel cell system reaches its destination. The system may be controlled to operate at a lower relative humidity in various ways. For example, the stoichiometry of the fuel cell system may be modified such that the fuel cell system operates at a lower fuel to air ratio, or fuel lean condition. In another example, the humidity at the inlet to the cathode side of the fuel cell stack may be reduced. In yet another example, the temperature of the fuel cell stack may be permitted to rise by controlling the coolant loop for the fuel cell system. As the temperature of the fuel cell stack increases, water evaporates and the relative humidity also decreases. The controller may use one of these control methods to adjust the relative humidity of the fuel cell stack, or may use a combination thereof.

According to one example, the fuel cell system may operate at a relative humidity of 50-75% within the fuel cell stack under normal operating conditions. The controller may cause the fuel cell system to operate at a relative humidity within the range of 15-40%, 15-30%, 20-35%, or other ranges. Note that these values are given for representative purposes and are not intended to limit the scope of the disclosure.

Step 170 may be scheduled to begin when the fuel cell system is a predetermined distance or predetermined time period away from the predicted destination. For example, if the fuel cell system is predicted to be at the destination at a given time, e.g. 6:00, step 170 will be initialized at a predetermined time period, e.g. 00:30, before the given time, or at 5:30.

The fuel cell system is then shut down at 172. The system may be shut down at the predicted time and predicted destination, or alternatively, at the command of the user at another time or location. At block 174, the controller then determines if the stack temperature is going to be or is actually below its threshold value (T2) and/or if the ambient temperature is going to be or is actually below its threshold (T1) based on the present location of the fuel cell.

If the temperature is not below or predicted to be below its respective threshold value, the controller proceeds to 166 and monitors the fuel cell system after shut down. The system may have an on-board monitor or diagnostic that periodically is scheduled to run and check the ambient temperature and fuel cell stack temperature.

If the temperature is below or predicted to be below its respective threshold value, the controller proceeds to 176 and completes the shut down process for the fuel cell system. In some embodiments, the fuel cell controller may operate the motor of the compressor on the cathode side of the fuel cell stack to provide pressurized air to blow out the cathode side of the stack. The blow out process may occur if the ambient temperature is predicted to be below a threshold value (T3) which is the same as or is less than the threshold value (T1). Alternatively, the blow out process may occur if the stack temperature is predicted to be below a threshold value (T4) which is the same as or is less than the threshold value (T2). A blow out process may be scheduled for a time period after fuel cell system shut down to allow the stack to cool down. In other embodiments, the controller may not conduct a blow-out process for the fuel cell regardless of the temperatures. After the preparation is completed at 176, the method 150 returns to 166.

Since the fuel cell system was operated at a reduced relative humidity, the fuel cell stack has a lower relative humidity at shut down, and there is less moisture within the stack that can condense that may turn to ice during freezing conditions. Since there is a reduced potential for ice formation within the stack, the fuel cell is easier to start in freezing conditions.

FIG. 4 illustrates an example of a fuel cell system during a shut down event according to the prior art. The relative humidity of the fuel cell stack, or the stack hydration state, is shown by line 200 with respect to time. When the fuel cell system receives a shut down command at time 202, the controller either operates the compressor to provide pressurized air to the cathode side of the stack to conduct a blow-out process or actively heats the fuel cell stack to increase the stack temperature to evaporate and remove water content from the fuel cell stack. As can be seen by line 200, the humidity in the stack decreases after shut down. The blow out process may not remove enough water for a fuel cell system start request at cold ambient temperatures, or the start process may be too slow to meet user expectations. Heating the stack after shut down is an energy intensive process and will adversely affect the efficiency of the fuel cell system.

FIG. 5 illustrates an example of a fuel cell system during a shut down event according to the present disclosure. The relative humidity of the fuel cell stack, or the stack hydration state, is shown by line 210 with respect to time. During time period 212, the controller is running method 150 and monitoring the predicted destination, predicted ambient temperature, and predicted soak length for the fuel cell system. During time period 212, the controller determines that the stack temperature is predicted to be below its threshold temperature after shutdown (step 168). At time 214, the controller commands the fuel cell system to operate at a reduced relative humidity (step 170). Time 214 occurs at a predetermined time period 218 before the predicted shut down time 216. As can be seen from FIG. 5, the relative humidity in the stack 210 decreases before shut down during time period 218. At time 216, when the fuel cell system is shut down, the relative humidity 210 is already at a low value, and no action needs to be taken. If the relative humidity needs to be reduced further, a blow-out process similar to that shown in FIG. 4 could cause an additional decrease after shut down; however, a smaller decrease would be needed from the blow out process since the humidity was already largely decreased during system operation.

The controller may know or be able to predict the exact location where the vehicle and fuel cell system are heading. This information, combined with prior route history, traffic information and other information either wirelessly available, determined by the controller, or entered through the user interface, may allow the fuel cell system to be operated in a manner that will better prepare it for low ambient temperatures, including those below freezing levels. The driving cycle and user profile, including trip duration, average power level, expected coolant temperature at destination, and expected weather conditions at destination, may be used to control the operating conditions of the fuel cell system, including stoichiometry, humidity, cooling control, etc., in order to better condition the stack and system for freezing conditions.

According to one example, a vehicle may leave a sea level location at an ambient temperature of 20 Celsius, and drive to a high altitude destination with an ambient temperature of −30 Celsius or colder, where a freeze preparation is necessary. If this destination is known or predicted based on user input, stored knowledge of prior visits to this destination, or machine learning based on routing and probable destinations, the fuel cell may be prepared for freezing conditions by reducing the hydration state of the stack before arrival at the destination. This allows time to properly condition the system before shut down, and eliminates the need for energy-intensive freeze preparation measures such as a post shut down blow-out. There is also a benefit in that the hydration state of the fuel cell stack may be reduced at operating coolant temperatures, something a post shut down procedure cannot do unless additional fuel is consumed from the tank.

In addition, on-board and off-board sensor history can be used to determine the appropriate freeze preparation method for the fuel cell system. The controller can learn the user's habits and employ this information to heat the system up quickly at start up if the drive history includes many short duration drives. Alternatively, the sensor history may be used to modify the post shut down freeze preparation, given knowledge of prior hydration states of the stack and the predicted ambient conditions based on weather forecasts. Variable calibration and modified parameters, including threshold values and stack temperature estimation models or tables, may be downloaded from a remote source. By using information received from a wireless source, as well as from sensors on-board the fuel cell system, a method for fuel cell preparation in freezing conditions and recovery from these conditions may be implemented using weather forecasts and geographic information such as predicted destinations. The method may adapt as data is received and updated in real-time, thereby optimizing system operating conditions and selectively applying any post-shutdown procedures with foresight of the ambient conditions to which the system may be subjected.

Various embodiments of the present invention have associated non-limiting advantages. For example, by reducing the humidity in the fuel cell stack prior to shut down based on predictive information, the system hydration state is controlled prior to freezing, which may increase the lifetime for the fuel cell stack, lead to faster fuel cell system start times in freezing conditions, and meet or exceed user expectations. It also reduces the need for post shut down processes to reduce the stack hydration state, which are less effective, and reduce fuel cell efficiencies.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a fuel cell system having a fuel cell stack for generating power; and
a controller configured to (i) receive a first signal indicative of a predicted ambient temperature at a specified location, and (ii) command the fuel cell system to operate at a reduced relative humidity in the fuel cell stack and propel the vehicle towards the specified location when the predicted ambient temperature is below a threshold value.

2. The vehicle of claim 1 wherein the controller is further configured to receive a second signal indicative of a predicted time for vehicle shut down; and
wherein the fuel cell system is commanded to operate at the reduced relative humidity in the fuel cell stack for a time period preceding the predicted time for vehicle shut down when the predicted ambient temperature is below the threshold value.

3. The vehicle of claim 1 wherein the controller is further configured to detect a relative humidity level in the fuel cell stack at vehicle shut down, and
wherein the controller is further configured to operate an air compressor to supply pressurized air to the fuel cell stack after vehicle shut down if the relative humidity level is above a threshold value.

4. The vehicle of claim 1 wherein the controller is further configured to command the fuel cell system to operate with a reduced inlet humidity at a cathode side of the fuel cell stack to reduce relative humidity.

5. The vehicle of claim 1 wherein the controller is further configured to command the fuel cell system to operate with a reduced fuel-air ratio to reduce relative humidity.

6. The vehicle of claim 1 wherein the specified location is a predicted destination for the vehicle.

7. The vehicle of claim 1 wherein the predicted ambient temperature corresponds to a period of time that occurs after a predicted vehicle shutdown event.

8. The vehicle of claim 1 wherein the predicted ambient temperature corresponds to a period of time that generally occurs simultaneously with a predicted vehicle start time.

9. The vehicle of claim 3 wherein the threshold value is a first threshold value; and
wherein the controller is further configured to operate the air compressor to supply pressurized air to the fuel cell stack after vehicle shut down in response to the predicted ambient temperature being below a second threshold value, wherein the second threshold value is lower than the first threshold value.

10. The vehicle of claim 1 wherein the controller is further configured to command the fuel cell system to operate at the reduced relative humidity in the fuel cell stack and propel the vehicle towards the specified location when the predicted ambient temperature is below the threshold value and prior to a vehicle shut down request.

11. The vehicle of claim 1 wherein the controller is further configured to command the fuel cell system to operate at the reduced relative humidity in the fuel cell stack and propel the vehicle towards the specified location when an estimated stack temperature is below a freezing level, the freezing level a function of the predicted ambient temperature and an estimated soak length for the fuel cell system.

12. The vehicle of claim 1 wherein the reduced relative humidity is a percentage of a relative humidity for normal operation of the fuel cell system.

13. The vehicle of claim 1 wherein the controller is further configured to command the fuel cell system to operate at the reduced relative humidity in the fuel cell stack and propel the vehicle towards the specified location, wherein the fuel cell system is operated to provide electrical power to a battery and an electric motor to propel the vehicle.

14. A vehicle comprising:
a fuel cell system having a fuel cell stack; and
a controller configured to (i) receive a first signal indicative of a predicted ambient temperature and a second signal indicative of a predicted vehicle shut down time, and (ii) command the fuel cell system to operate at a reduced relative humidity in the stack for a time period preceding the predicted vehicle shut down time when the predicted ambient temperature is below a threshold value.

* * * * *